United States Patent
Cha et al.

(10) Patent No.: US 7,831,725 B2
(45) Date of Patent: Nov. 9, 2010

(54) DATA STRUCTURE AND METHOD FOR INITIATING A FLOW OVER AN EXTENDED CHANNEL

(75) Inventors: Sang Hoon Cha, Seoul (KR); Ho Jun Nam, Seoul (KR)

(73) Assignee: LG Electronics Inc., Seoul (KR)

( * ) Notice: Subject to any disclaimer, the term of this patent is extended or adjusted under 35 U.S.C. 154(b) by 646 days.

(21) Appl. No.: 11/477,901

(22) Filed: Jun. 30, 2006

(65) Prior Publication Data
US 2007/0106809 A1   May 10, 2007

(30) Foreign Application Priority Data
Nov. 10, 2005   (KR) .................. 10-2005-0107572

(51) Int. Cl.
*G06F 15/16* (2006.01)
(52) U.S. Cl. .................. 709/230; 370/235; 725/10
(58) Field of Classification Search .............. 709/230, 709/238, 201; 707/100; 725/10; 370/235
See application file for complete search history.

(56) References Cited

U.S. PATENT DOCUMENTS 6,145,001 A * 11/2000 Scholl et al. ............... 709/223
6,678,740 B1 * 1/2004 Rakib et al. ................ 709/247
6,718,552 B1 * 4/2004 Goode ...................... 725/95
2003/0053486 A1 * 3/2003 Okamori ................... 370/474
2005/0177845 A1   8/2005 Patariu et al.
2006/0098643 A1 * 5/2006 Pfeffer et al. .............. 370/389

FOREIGN PATENT DOCUMENTS

EP   1 748 645   1/2007

OTHER PUBLICATIONS

Anonymous: "National Renewable Security Standard (NRSS); CEA-679-C", XP017005363, Oct. 31, 2005.
Cablelabs: "Opencable Host Device 2.0 Core functional requirements", XP002531779, Jul. 8, 2005, pp. 1-68.
"HOST-POD Interface Standard", American National Standard, No. ANSI/SCTE282007, XP002517003, Jan. 1, 2007, pp. 1-244.

* cited by examiner

*Primary Examiner*—Salad Abdullahi
(74) *Attorney, Agent, or Firm*—McKenna Long & Aldridge LLP (57) ABSTRACT

A method included a receiving a request that includes information that defines a service type and information that can identify the request for this service type, wherein the request is required in order to initiate a flow over an extended channel; checking whether the extended channel can support the flow of the requested service type; and responding to the request, wherein the response includes information of the service type and information on whether the external channel can support the flow of the requested service type.

13 Claims, 8 Drawing Sheets

FIG. 1A

| Syntax | # of bits | Mnemonic |
|---|---|---|
| new_flow_req() { | | |
|     new_flow_req_tag | 24 | uimsbf |
|     length_field() | | |
|     service_type | 8 | uimsbf |
|     if (service_type==00) {/* MPEG section */ | | |
|       Reserved | 3 | bslbf |
|       PID | 13 | uimsbf |
|     } | | |
|     if (service_type==01) {/* IP unicast */ | | |
|       MAC_address | 48 | uimsbf |
|       option_field_length | 8 | uimsbf |
|       for {i=0; i<option_field_length; i++) { | | |
|         option_byte | 8 | uimsbf |
|       } | | |
|     } | | |
|     if (service_type==02) {/* IP multicast */ | | |
|       Reserved | 4 | bslbf |
|       multicast_group_ID | 28 | uimsbf |
|     } | | |
| } | | |

FIG. 1B

| Syntax | # of bits | Mnemonic |
|---|---|---|
| new_flow_cnf() {     new_flow_cnf_tag     length_field()     service_type     status_field     flows_remaining     if (service_type==00) {         if (status_field==0x00) {         flow_id     }     Reserved     PID } if (service_type==01) {     if (status_field==0x00) {         flow_id         IP_address         flow_type         flags         max_pdu_size         option_field_length         for (i=0; i<option_field_length; i++) {             option_byte         }     }     MAC_address } if (service_type==02) {     if (status_field==0x00) {         flow_id     }     Reserved     multicast_group_ID } } | 24<br><br>8<br>8<br>8<br><br><br>24<br><br>3<br>13<br><br><br><br>24<br>64<br>8<br>3<br>13<br>8<br><br>8<br><br><br>48<br><br><br>24<br><br>4<br>28 | uimsbf<br><br>uimsbf<br>uimsbf<br>uimsbf<br><br><br>uimsbf<br><br>bslbf<br>uimsbf<br><br><br><br>uimsbf<br>uimsbf<br>uimsbf<br>uimsbf<br>uimsbf<br>uimsbf<br><br>uimsbf<br><br><br>uimsbf<br><br><br>uimsbf<br><br>bslbf<br>uimsbf |

| status_field | Returns the status of the new_flow_req |
|---|---|
| 0x00 | Request granted, new flow created |
| 0x01 | Request denied, number of flows exceeded |
| 0x02 | Request denied, service_type not available |
| 0x03 | Request denied, network unavailable or not responding |
| 0x04 | Request denied, network busy |
| 0x05 | Request denied MAC address not accepted |
| 0x06-0xFF | Reserved |

FIG. 4A

| Syntax | # of bits | Mnemonic |
|---|---|---|
| new_flow_req() {<br>    new_flow_req_tag<br>    length_field()<br>    service_type<br>    transaction_id<br>    if (service_type==00) {<br>        Reserved<br>        PID<br>    }<br>    if (service_type==01) {<br>        MAC_address<br>        option_field_length<br>        for (i=0; i<option_field_length; i++) {<br>            option byte<br>        }<br>    }<br>    if (service_type==02) {<br>        Reserved<br>        multicast_group_ID<br>    }<br>} | <br>24<br><br>8<br>8<br><br>3<br>13<br><br><br>48<br>8<br><br>8<br><br><br><br><br>4<br>28 | <br>uimsbf<br><br>uimsbf<br>uimsbf<br><br>bslbf<br>uimsbf<br><br><br>uimsbf<br>uimsbf<br><br>uimsbf<br><br><br><br>bslbf<br>uimsbf |

FIG. 4B

| Syntax | # of bits | Mnemonic |
|---|---|---|
| new_flow_cnf() { | | |
|     new_flow_cnf_tag | 24 | uimsbf |
|     length_field() | | |
|     transaction_id | 8 | uimsbf |
|     status_field | 8 | uimsbf |
|     flows_remaining | 8 | uimsbf |
|     if (status_field==0x00) { | | |
|         flow_id | 24 | uimsbf |
|         service_type | 8 | uimsbf |
|         if (service_type==01) { | | |
|             IP_address | 64 | uimsbf |
|             flow_type | 8 | uimsbf |
|             flags | 3 | uimsbf |
|             max_pdu_size | 13 | uimsbf |
|             option_field_length | 8 | uimsbf |
|             for (i=0; i<option_field_length; i++) { | | |
|                 option_byte | 8 | uimsbf |
|             } | | |
|         } | | |
|     } | | |
| } | | |

DATA STRUCTURE AND METHOD FOR INITIATING A FLOW OVER AN EXTENDED CHANNEL

This application claims the benefit of the Korean Patent Application No. 10-2005-0107572, filed on Nov. 10, 2005, which is hereby incorporated by reference as if fully set forth herein.

BACKGROUND

1. Field of the Disclosure

The present disclosure relates to broadcasting technology, and more particularly, to broadcast receivers, data structures, and methods for initiating a flow over an extended channel.

2. Background

Generally, a broadcast system may include a broadcasting station transmitting contents through wired (e.g., telephone or cable) or wireless (e.g., cellular or satellite) network and at least one host, such as a broadcast receiver, that receives the contents. The broadcast receiver may include a built-in communication interface. Where the broadcast receiver does not have a built-in communication interface, a communication card may be used by the broadcast receiver in order to interface with the broadcasting station.

In the case of cable broadcasting, a cable broadcast system may be divided into a cable broadcasting station that transmits cable broadcasts and a cable broadcast receiver that receives cable broadcasts. The cable broadcasting station may be referred to as a system operator (SO) head end or a multiple system operator (MSO) head end.

The cable broadcast receiver may be an OpenCable Digital TV or a CableReady Digital TV, etc., may adopt an open cable standard, and may use a cable card or a Point of Deployment (POD) module that may include a conditional access (CA) system. The cable card may be inserted into a slot located at the cable broadcast receiver. Alternatively, the cable broadcast receiver may have a built-in module that is a functional equivalent of the cable card. In this instance, the cable broadcast receiver may receive a CA system, in a form of a software, that is downloadable from the broadcasting station and stored in a memory of the cable broadcast receiver. The downloadable software is usually referred to as downloadable conditional access system (DCAS). As such, the cable broadcast receiver may have a configuration that may or may not require a separate cable card.

A description referring to a cable broadcast receiver including a cable card will be given although it will be apparent that the description is also applicable to a cable broadcast receiver that has a built-in module performing a similar functional equivalent. An interface including a data channel and an extended channel may be formed between the cable card and the cable card receiver. The data channel may be set such that the cable broadcast receiver and the cable card may mutually exchange control signals therebetween, and the extended channel may be set such that the data channel and the cable card may mutually exchange real data therebetween.

For example, after the cable card communicates with the headend to analyze commands received from the headend, the cable card may serve to perform instructions of the headend while the cable card is communicating with the cable broadcast receiver through the data channel and the extended channel, or the cable card may serve to transmit contents inputted by a user to the headend.

A transmission connection of a data type is usually defined between the cable card and the cable broadcast receiver in order for such data to be transmitted through the extended channel. A transmission connection may be referred to as a flow. For example, in order to transmit an MPEG section data thereto, an MPEG section flow is first set between the cable card and the cable broadcast receiver, and then MPEG section data is transmitted through the flow that has been set up.

SUMMARY

Accordingly, the present disclosure is directed to a broadcast receiver, data structure, and method for initiating a flow over an extended channel.

For example, the disclosure may disclose a broadcast receiver, data structure, and interfacing method that is capable of efficiently transmitting data between the cable broadcast receiver and the cable card, through an extended channel.

Advantages, objects, and features of the invention in part may become apparent in the description which follows and in part may become apparent to those having ordinary skill in the art upon examination of the following or may be learned from practice of the invention. The objectives and other advantages of the various embodiments of the invention may be realized and attained by the structures and processes described in the written description, in the claims, and in the appended drawings.

To achieve these objects and other advantages and in accordance with the purpose of the invention, as embodied and broadly described herein, a method includes receiving a request that includes information that defines a service type and information that can identify the request for this service type, wherein the request is required in order to initiate a flow over an extended channel; checking whether the extended channel can support the flow of the requested service type; and responding to the request, wherein the response includes information of the service type and information on whether the external channel can support the flow of the requested service type.

In another aspect, a method includes receiving a request that includes information that defines a service type, information that identifies a transaction sequence of the request, wherein the request is required in order to initiate a flow over an extended channel; checking whether the extended channel can support the flow of the requested service type; and responding to the request, wherein the response includes information that identifies the transaction sequence and information on whether the extended channel can support the flow of the requested service type.

In another aspect, a method includes receiving a request that includes information that defines a service type and information that can identify the request for this service type, wherein the request is required in order to initiate a flow over the extended channel; and responding to the request, wherein the response includes a flow identifier (ID) and at least a 64 bit Internet Protocol (IP) address after the request for the flow over the external channel is granted.

In yet another aspect, a data structure associated with a response to a request for a flow over an extended channel includes a service type field containing data that defines the requested type of service, a status information field containing data that indicates whether the flow over the extended channel can be supported, and a request identification field that contains data that can identify the request for this type of service.

In another aspect, a data structure for requesting a flow over an extended channel includes a service type field containing data that defines the requested type of service, and an identification information field containing data that defines a transmission sequence of a request.

In yet another aspect, a data structure for responding to a request for a flow over an extended channel when a type of service is unicast service includes a status information field containing data that indicates that the flow over the extended channel can be supported, and an IP address field containing an IP address having at least 64 bits.

It is to be understood that both the foregoing general description and the following detailed description are exemplary and explanatory and should not be construed as limiting the scope of the claims.

BRIEF DESCRIPTION OF THE DRAWINGS

The accompanying drawings, which are included to provide a further understanding of the disclosure are incorporated herein and constitute a part of this application. The drawings, together with the description, serve to explain the various embodiments of the invention. In the drawings.

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts for simplicity.

As may be described herein, a cable broadcast receiver may include an out-of-band (OOB) quadrature phase-shift keying (QPSK) modem and a Data Over Cable Service Interface Specifications (DOCSIS) modem, and may support a DOCSIS Set-top Gateway.

The description may describe a way to enhance efficiency of communication between a cable broadcast receiver and a cable card when setting an extended channel flow, to reduce its implementation complexity when it is actually implemented, and to provide integrity and extensibility of protocol.

The Extended channel may be CPU interface where the cable broadcast receiver and the cable card may transmit and receive data therebetween. Usually, data types (referred to as service types), which are transmitted thereto through the Extended channel, include an MPEG section, an IP unicast (IP_U), IP Multicast (IP_M) and DSG.

Here, an end, which may be a cable card or a cable broadcast receiver, may attempt to perform connection setting for the Extended channel flow by transmitting a new_flow_req( ) application protocol data unit (APDU), which includes a service type for connection and related information. At another end, which may be a cable broadcast receiver or a cable card, it may receive the new_flow_req( ) APDU and determine whether connection setting of a corresponding flow can be performed. The another end then may include the determination result in a new_flow_cnf( ) APDU and may transmit it to the end that sent the new_flow_req( ) APDU.

In the description below, a first and a second embodiment will be used to describe data structures and methods for setting a flow on the Extended channel.

First Embodiment

Figure 1A:
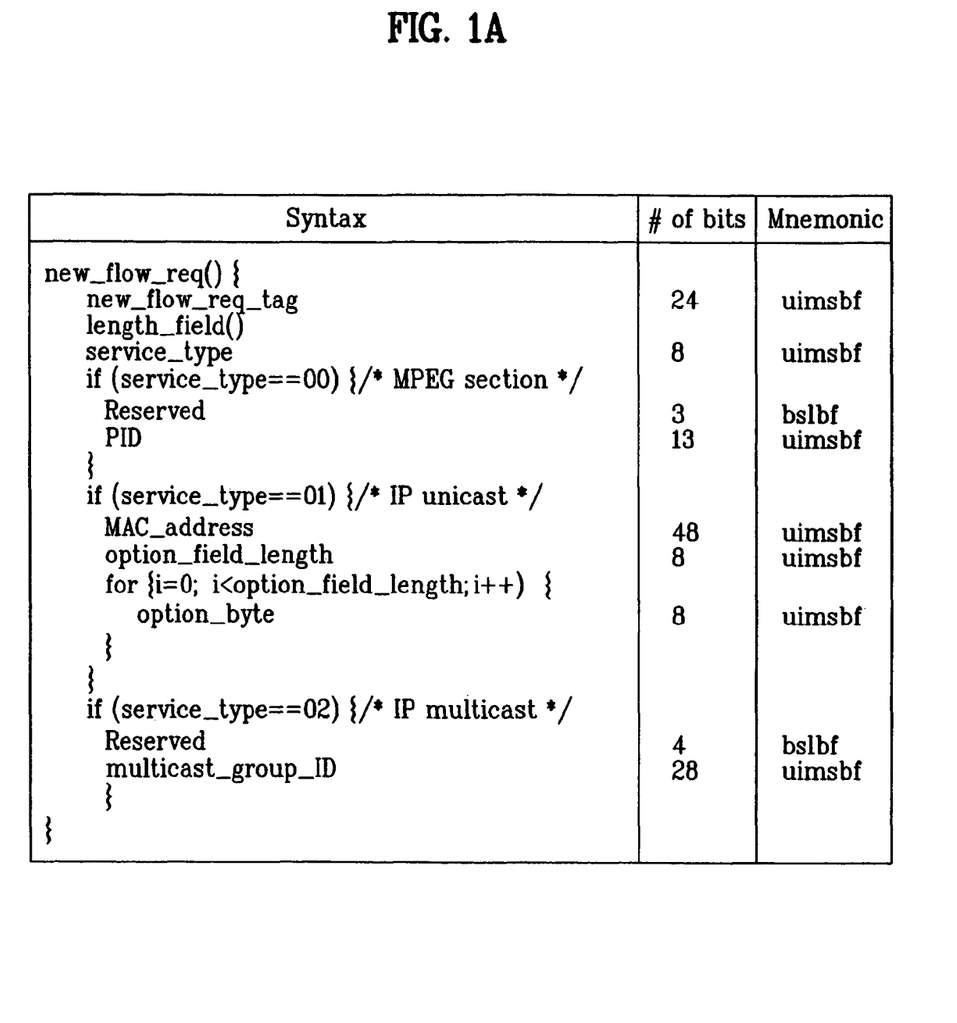
FIG. 1A illustrates a structure of a request syntax for requesting a setting of a connection of a flow over an extended channel according to a first embodiment of the present invention.
Figure 1B:
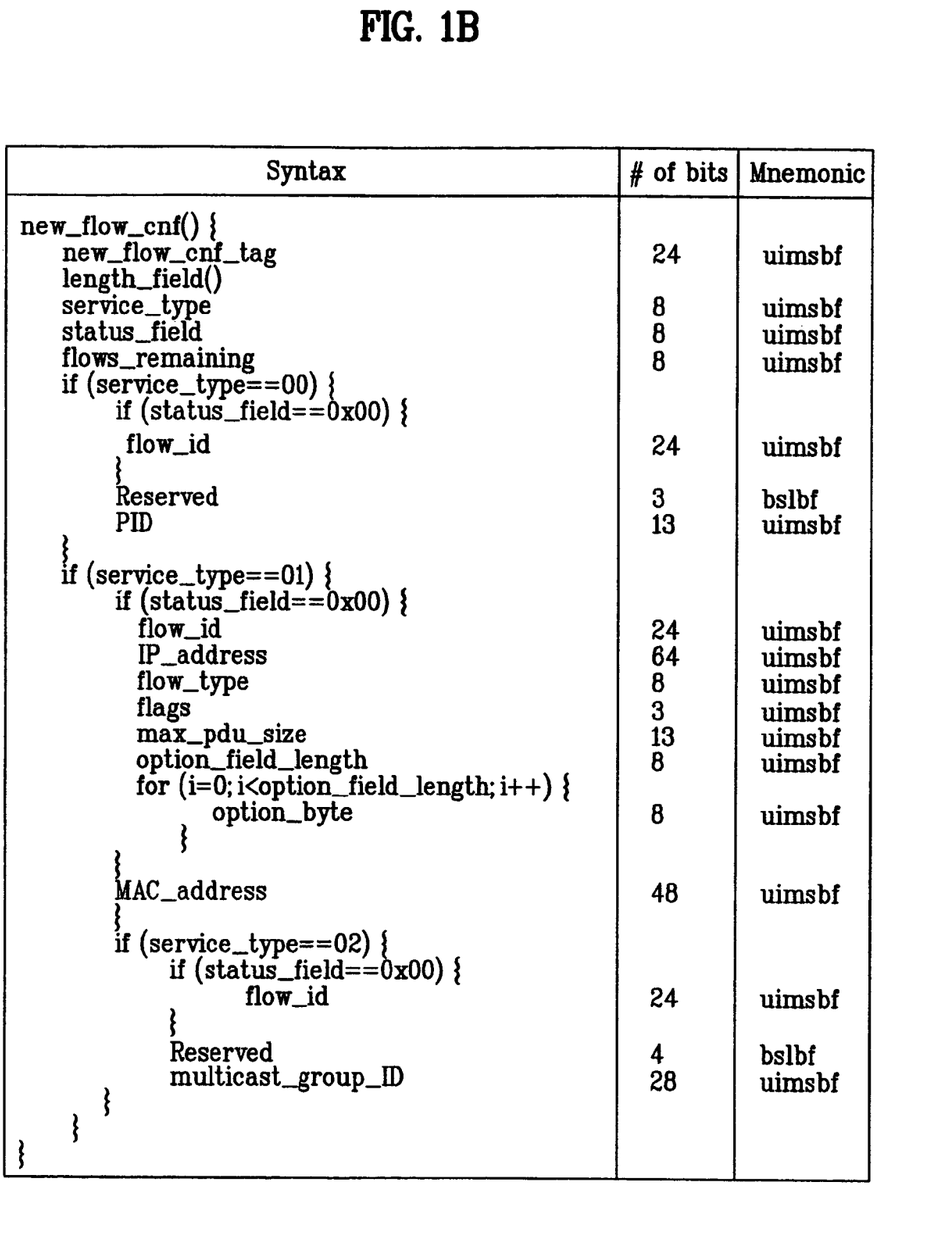
FIG. 1B illustrates a structure of a response syntax for responding to a connection request of FIG. 1A according to one embodiment of the present invention.

FIG. 1A illustrates a structure of a request syntax, new_flow_req( ) APDU, and FIG. 1B illustrates a structure of a response syntax, new_flow_cnf( ) APDU according to one embodiment of the invention.

As shown in FIG. 1A, when a field value of a service type (service_type) is 00 (or Moving Picture Experts Group (MPEG) section), a Packet Identifier (PID) value is transmitted thereto. When the field value is 01 (or an Internet Protocol (IP) Unicast), Media Access control (MAC) address (MAC_address) is transmitted thereto. Also, the field value is 02 (or an IP Multicast), a Multicast group ID (multicast_group_ID) is transmitted thereto.

An end, such as a cable broadcast receiver or a cable card, which receives a new_flow_req( ) APDU as shown in FIG. 1A, may determine whether connection setting of a corresponding flow can be performed and may include the results of the determination and information related thereto in a new_flow_cnf( ) APDU as shown in FIG. 1B, and then transmits it thereto in response to an end that sent the new_flow_req( ) APDU.

As shown in FIG. 1B, the syntax includes a service type field (service_type), a status field (status_field), and three condition loops which are performed according to a value of the service type field.

The service type field is set such that its value is identical to a value transmitted from the new_flow_req( ) APDU. The status field (status_field) indicates information for a state as to whether connection setting of a corresponding flow, which is requested in the new_flow_req( ) APDU, can be performed.

Figure 3:
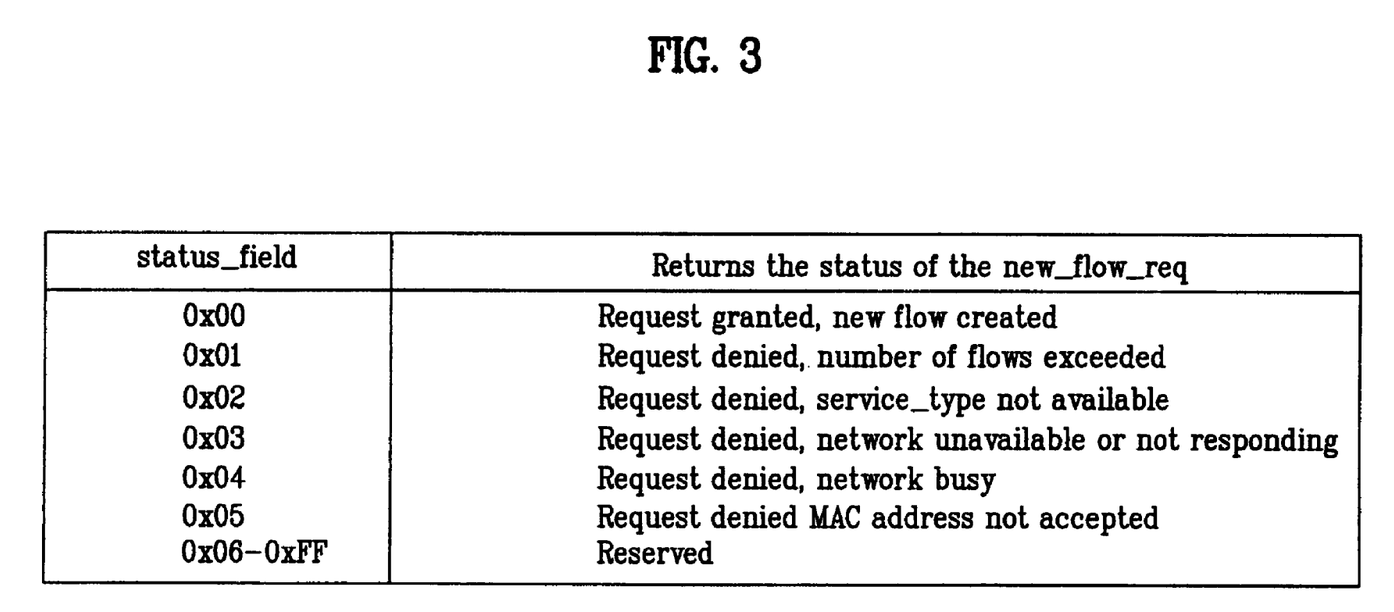
FIG. 3 illustrates a general example of status field values included in request and response syntaxes according to one embodiment of the present invention.

FIG. 3 illustrates a general example of status field values included in request and response syntaxes. For example, when the status field value is 0×00, it indicates that a request for connection setting of a new flow is granted (Request granted, new flow created) Also, when the status field value is 0×01, it indicates that a request is denied since the number of flows is exceeded (Request denied, number of flows exceeded).

When the service type field value is 00 (namely, a MPEG section), an executed condition loop of the MPEG section allocates a PID field transmitting PID whose value is identical to a value received in the new_flow_req( ) APDU. Also, the condition loop for the MPEG section includes a condition loop in a front part of the PID field thereof, in which the condition loop is executed only if the status field value is 0×00. Also, the condition loop allocates a flow identification field (flow id) therein.

When the service type field value is 01 (namely, an IP Unicast), the executed IP_U condition loop allocates a MAC address field transmitting an MAC address whose value is identical to a value received in the new_flow_req( ) APDU. Also, the IP_U condition loop includes a condition loop in a front part of the MAC address field thereof, in which the condition loop is executed only if the status field value is 0x00. Also, the condition loop allocates a flow identification field (flow_id), an IP address field (IP_address), a flow type field (flow_type), a flag field, a maximum PDU size field (max_pdu_size), etc., therein.

A length of the IP address field is set to at least 64 bits in order to support both Internet Protocol (IP) ver. 6 (IPv6) and IP ver. 4 (IPv4). For example, the lower 32 bits of the 64 bits may be used for 32 bit address of the IPv4, and the upper 32 bits may set with predetermined values. In other words, unused bits of the 64 bits in the IP address are set with predetermined values.

Although the example described above allocates 64 bits for an IP address, it should be appreciated that more than 64 bits may be allocated. In this case, unused bits are set with predetermined values.

When the service type field value is 02 (namely, an IP Multicast), the executed IP_M condition loop allocates a multicast group identification field (multicast_group_ID) transmitting a multicast group ID whose value is identical to a value received in the new_flow_req( ) APDU. Also, the IP_M condition loop includes a condition loop in front part of the multicast group ID field thereof, in which the condition loop is executed only if the status value is 0x00. Also, the condition loop allocates a flow identification field (flow id) therein.

As shown in FIG. 1B, the service type information is usually included in the new_flow_cnf( ) and then transmitted thereto.

Also, when the status field value is not 0x00, or when it is 'Request denied,' it includes a plurality of new_flow_cnf( ) and information to correctly correspond new_flow_req( ) to the plurality of new_flow_cnf( ). To this end, according to one embodiment of the present invention: when the service type is an MPEG section, a PID value, which is identical to a PID value transmitted from the new_flow_req( ), is usually included in the new_flow_cnf( ), and then transmitted thereto; when the service type is IP_U, MAC address information is usually included in the new_flow_cnf( ), and then transmitted thereto; and when the service type is an IP_M, multi group identification information is usually included in the new_flow_cnf( ), and the transmitted thereto.

Therefore, the embodiment of the present invention of FIG. 1B has advantages as follows:

1) In a state where an end transmits a new_flow_req( ) APDU, the end receiving a new_flow_cnf( ) APDU in response to the new_flow_req( ) APDU may recognize which service type of request is denied when a request for flow connection setting through the new_flow_req( ) APDU is denied.

For example, assuming that a cable broadcast receiver transmits a new_flow_req( ) APDU, in which a service type is set to an IP_U, to a cable card, and the cable card transmits a new_flow_cnf( ) APDU whose status field is set to 0x01 (namely, Request denied, number of flows exceeded), to the cable broadcast receiver, in response to the new_flow_req( ) APDU. In this case, since the new_flow_cnf ( ) APDU includes the service type and then transmitted, the cable broadcast receiver may recognize a state as to whether the flow of IP_U is exceeded.

2) In a state where an end successively transmits at least two or more than two new_flow_req( ) APDU thereto, even though the end receives at least one new_flow_cnf( ) APDU in which a request for flow connection setting is denied, of the transmitted new_flow_req( ) APDU, the end may recognize which service type of request is denied.

For example, we assume that a cable broadcast receiver transmits two new_flow_req( ) APDU, in which a service type is set to an IP_U and an IP_M, to a cable card, and the cable card transmits two new_flow_cnf( ) APDU to the cable broadcast receiver, in which a status field value of one new_flow_cnf( ) APDU is set to 0x05 (namely, Request denied-MAC address not accepted) for the IP_U, and a field value of another new_flow_cnf( ) APDU is set to 0x03 (namely, Request denied-network unavailable or not responding) for the IP_M.

Here, since each new_flow_cnf( ) APDU includes service type information therein and is then transmitted thereto, the cable card broadcast receiver may recognize that the new_flow_cnf( ) APDU whose status field value is 0x05 is a response to the IP_U service type and then new_flow_cnf( ) APDU whose status field value is 0x03 is a response to the IP_M service type.

In this case, the cable broadcast receiver may transmit the new_flow_req( ) APDU of an IP_U to the cable card and then the new_flow_req( ) APDU of an IP_M to the cable card with a certain time delay. The cable card may effectively perform an operation where the new_flow_cnf( ) APDU of an IP_U is transmitted later than the new_flow_cnf( ) APDU of an IP_M, due to internal process and operational environment of the cable card. The opposite procedure is the same that as the above procedure. Namely, the procedure is effective such that at least two or more than two new_flow_req( ) APDU are transmitted, and then the new_flow_cnf( ) APDU is transmitted thereto, with a transmission sequence which is different from that of the new_flow_req( ) APDU.

3) In a state where an end transmits at least a plurality of new_flow_req( ) APDU of an MPEG section service type thereto, even though the end receives at least one new_flow_cnf( ) APDU in which a request for flow connection setting is denied, of the plurality of transmitted new_flow_req( ) APDU, the end may recognize which request for MPEG section PID is denied.

For example, assuming that: flow of MPEG section service type is set such that its number is not more than 6; in a state where five MPEG section flows are already set, a cable broadcast receiver transmits new_flow_req( ) APDU of three MPEG section service types to a cable card, in which PIDs of three MPEG section service types are different from each other; in response to such a request, the cable card may set a flow for a PID of the firstly transmitted new_flow_req( ) APDU to 0x00 (namely, Request granted) and responds to the request with the new_flow_cnf( ); and the cable card may the remaining flows of two to 0x01 (namely, Request denied, number of flows exceeded) and then responds to the request with new_flow_cnf( ).

In this case, since each new_flow_cnf( ) APDU includes service type information and PID information, the cable broadcast receiver may recognize that all of three new_flow_cnf( ) APDU are responses for the MPEG section service type; in which requests for MPEG section PIDs are allowed; and in which requests for MPEG section PIDs are denied.

The procedure is effective such that at least two or more than two new_flow_req( ) APDU for MPEG section service types are transmitted, and then the new_flow_cnf( ) APDU is transmitted thereto, with a transmission sequence which is different from that of the new_flow_req( ) APDU.

Also, the embodiment above may support IPv6 as well as IPv4, as the length of the IP address field is set to at least 64 bits.

Figure 2:
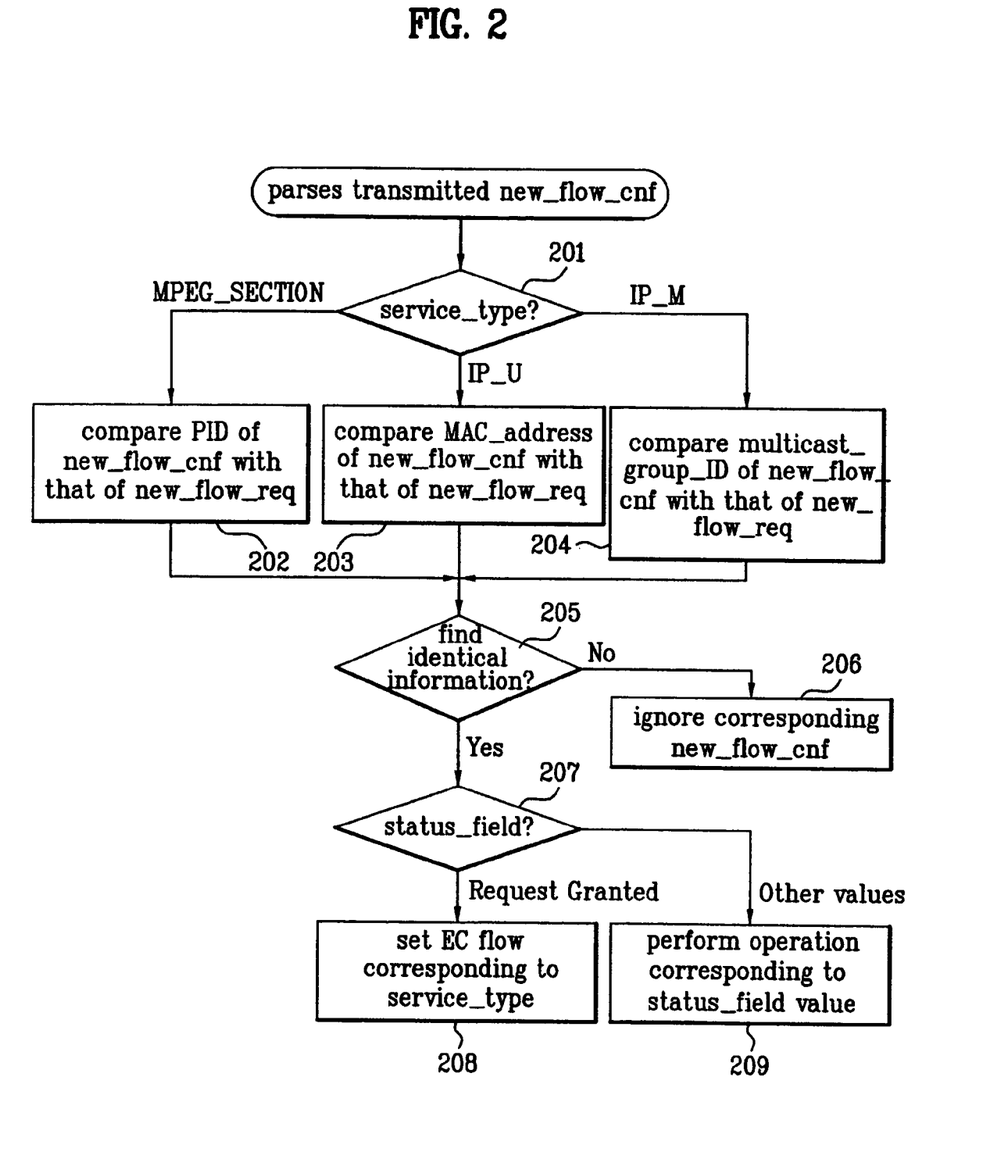
FIG. 2 illustrates an exemplary flow chart for describing operations of an end for receiving the response syntax of FIG. 1B according to one embodiment of the present invention.

FIG. 2 illustrates an exemplary flow chart for describing operations of an end for receiving the response syntax of a new_flow_cnf( ) APDU, as shown in FIG. 1B.

At step 201, a transmitted new_flow_cnf APDU is parsed to extract a service type field value in order to determine a service type. If the service type field value indicates an MPEG section, the process continues to step 202. Otherwise, if the service type field value indicates an IP_U, the process continues to step 203. However, if the service type field value indicates an IP_M, the process continues to step 204.

Referring now to step 202, a PID of the new_flow_cnf( ) is compared with that of the plural new_flow_req( ). The process then proceeds to step 205 where a check is performed as to whether there are identical PIDs. if the determination at step 205 is made that identical PIDs exist, the process proceeds to step 207 where check is performed as to whether a status field value of the new_flow_cnf( ) APDU is 0×00. If the status field value is 0×00, or if connection setting is allowed, the MPEG section extended channel flow is set at step 208. On the other hand, if the status field value is not 0×00, or if connection setting is denied, operations corresponding to status field values are performed in step 209. On the other hand, at step 205, if the determination is made that identical PIDs do not exist, a corresponding new_flow_cnf( ) APDU is ignored in step 206.

Referring to step 203, an MAC_address of the new_flow_cnf( ) is compared with that of the plural new_flow_req( ), and then the process proceeds to step 205. At step 205, a check is performed as to whether there are identical MAC addresses. If identical MAC addresses exist, then a check is performed as to whether a status field value of the new_flow_cnf( ) APDU is 0×00 in step 207. If connection setting is allowed, then the process proceeds to step 208, where the IP_U extended channel flow is set. On the other hand, if the status field value is not 0×00, or if connection setting is denied, operations corresponding to status field values are performed in step 209. On the other hand, at step 205, if the determination is made that identical MAC addresses do not exist, a corresponding new_flow_cnf( ) APDU is ignored in step 206.

Referring to step 204, a multicast_group_ID of the new_flow_cnf( ) APDU is compared with that of the plural new_flow_req( ) APDU, and the process proceeds to step 205. At step 205, a check is performed as to whether there are identical multicast group identifications. If identical multicast group IDs exist, then at step 207, a check is performed as to whether a status field value of the new_flow_cnf( ) APDU is 0×00. If connection setting is allowed, then the IP_M extended channel flow is set in step 208. Otherwise, if the status field value is not 0×00, or when connection setting is denied, operations corresponding to status field values are performed in step 209. On the other hand, at step 205, if the determination is made that the identical multicast group IDs do not exist, a corresponding new_flow_cnf( ) APDU is ignored in step 206.

Second Embodiment

Figure 4A:
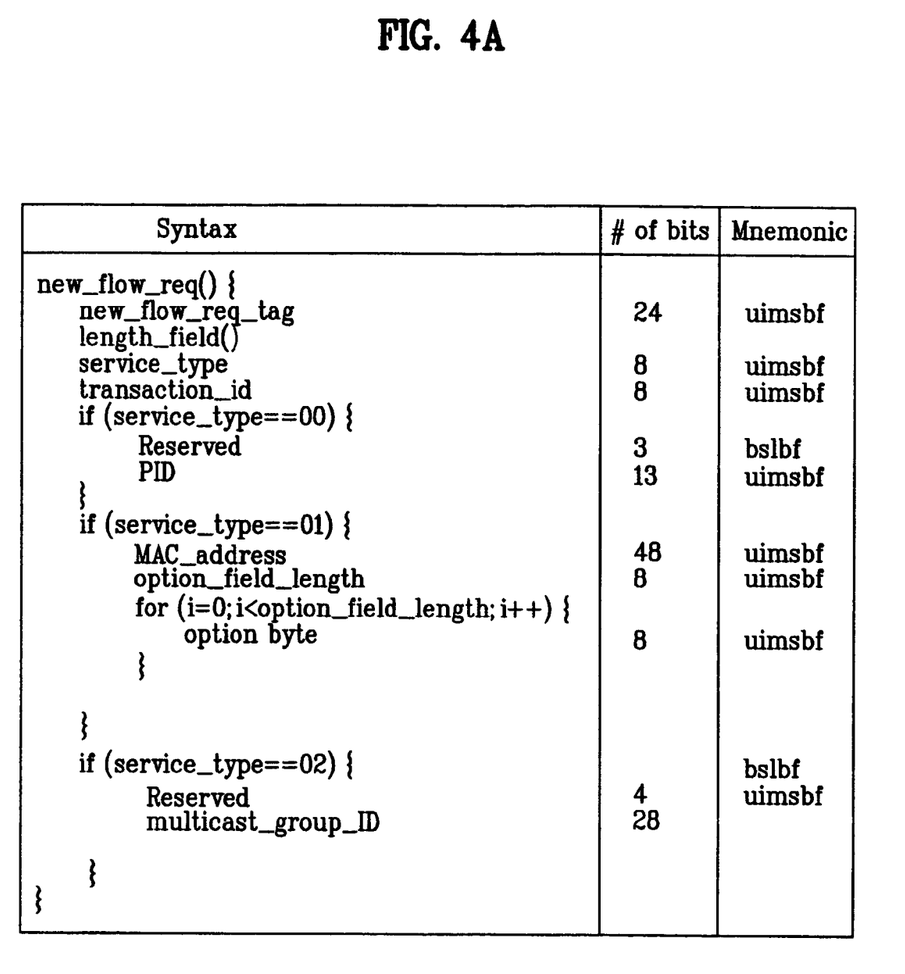
FIG. 4A illustrates a structure of a request syntax for requesting a setting of a connection of a flow over an extended channel according to a second embodiment of the present invention.
Figure 4B:
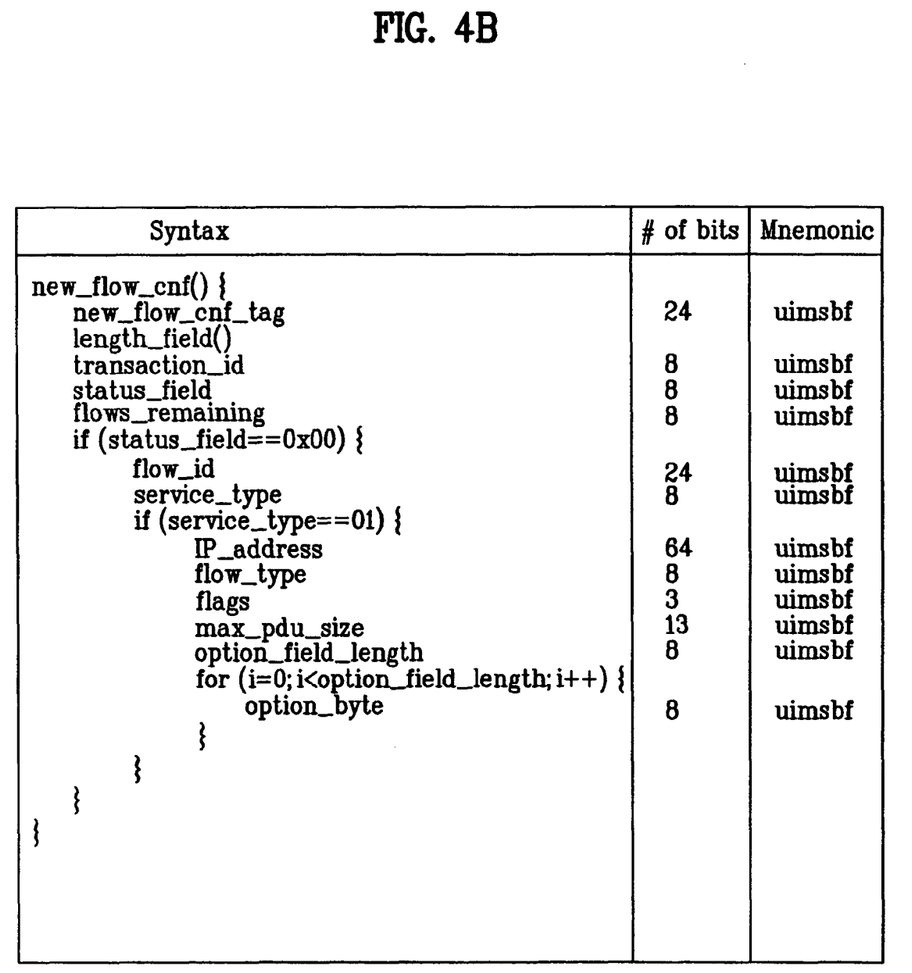
FIG. 4B illustrates a structure of a response syntax for responding to the connection request of FIG. 4A according to one embodiment of the present invention.

FIG. 4 illustrates a structure of a request syntax describing an interfacing method between a cable broadcast receiver and a cable card according to a second embodiment of the present invention. More specifically, FIG. 4A illustrates a structure of a request syntax, new_flow_req( ) APDU, for requesting an extended channel flow connection set request according to one embodiment of the present invention. FIG. 4B illustrates a structure of a response syntax, new_flow_cnf( ) APDU, for responding to the connection set request of FIG. 4A according to one embodiment of the present invention.

As shown in FIG. 4A, the syntax includes a service type field (service_type), a transaction identification field (transaction_id field), three condition loops which are performed according to a value of the service type field.

The service type field indicates service types for requesting connection setting of a flow.

The transaction ID field is allocated to a new_flow_req( ) and a new_flow_cnf( ), respectively. The length of the transaction ID field according to an embodiment of the present invention may be implemented with 8 bits.

Each time an end transmits the new_flow_req( ) APDU thereto, the end transmitting the new_flow_req( ) APDU increases a transaction ID field value by 1. Also, an end transmitting the new_flow_cnf( ) APDU, in response to the new_flow_req( ) APDU, substitutes a value, which is identical to the transaction ID field in the received new_flow_req( ), in the transaction ID field of the new_flow_cnf( ) APDU, and then transmits it thereto.

As shown in FIG. 4A, there are three condition loops after the transaction ID field, one of them is performed according to the service type field value.

Namely, when the service type field (service_type) value is 00, or MPEG section, the first condition loop is performed to transmit a PID value thereto. When the service type field value is IP Unicast (IP_U), the second condition loop is performed to transmit a MAC address (MAC_address) thereto. Also, when the service type field value is 02, or IP multicast (IP_M), the third condition loop is performed to transmit the multicast group ID (multicast_group_ID) thereto.

As shown in FIG. 4A, an end receiving the new_flow_req( ) APDU includes a state as to whether a corresponding flow connection setting can be performed and information related to the status in the new_flow_cnf( ) APDU of FIG. 4B, and then transmits it thereto in response to the request.

As shown in FIG. 4B, the syntax includes a transaction ID field, a status field (status_field), and condition loops which are performed according to the status field values.

The transaction ID field is set to a value which is identical to that of the new_flow_req( ) APDU. Also, the status field (status_field) indicates information through corresponding values of FIG. 3, in which the information is related to a state as to whether a corresponding flow connection setting, which is requested by the new_flow_req( ) APDU, can be performed.

Also, when the status field value is 0×00, or when a connection setting request is granted, the executed condition loop allocates a flow ID field and a service type field therein. Also, the condition loop includes an IP_U condition loop after a service field therein, in which the IP_U condition loop is performed when the service type is 01, or IP unicast (IP_U). Here, the IP_U condition loop allocates an IP address field (IP_address), a flow type field (flow_type), a flag field, and a maximum PDU size field (max_pdu_size), etc. therein.

Similarly, the second embodiment of the present invention is implemented such that the length of the IP address field is set to at least 64 bits to support both IPv6 and IPv4. The lower 32 bits of the 64 bits are used for 32 bits address of the IPv4, and the upper 32 bits are set with predetermined values.

As such, since the second embodiment of the present invention allocates transaction field to the new_flow_req( )

APDU and the new_flow_cnf( ) APDU, respectively, to provide identification information and sequence information, it may have all advantages of the first embodiment of the present invention, as follows:

1) In a state where an end transmits a new_flow_req( ) APDU, the end receiving a new_flow_cnf( ) APDU in response to the new_flow_req( ) APDU may recognize which service type of request is denied when a request for flow connection setting through the new_flow_req( ) APDU is denied.

2) In a state where an end successively transmits at least two or more than two new_flow_req( ) APDU thereto, even though the end receives at least one new_flow_cnf( ) APDU in which a request for flow connection setting is denied, of the transmitted new_flow_req( ) APDU, it may recognize which service type of request is denied.

3) In a state where an end transmits at least a plurality of new_flow_req( ) APDU of an MPEG section service type thereto, even though the end receives at least one new_flow_cnf( ) APDU in which a request for flow connection setting is denied, of the plurality of transmitted new_flow_req( ) APDU, it may recognize which request for MPEG section PID is denied.

Also, the second embodiment of the present invention may support IPv6 as well as IPv4, as the length of the IP address is set to at least 64 bits.

Figure 5:
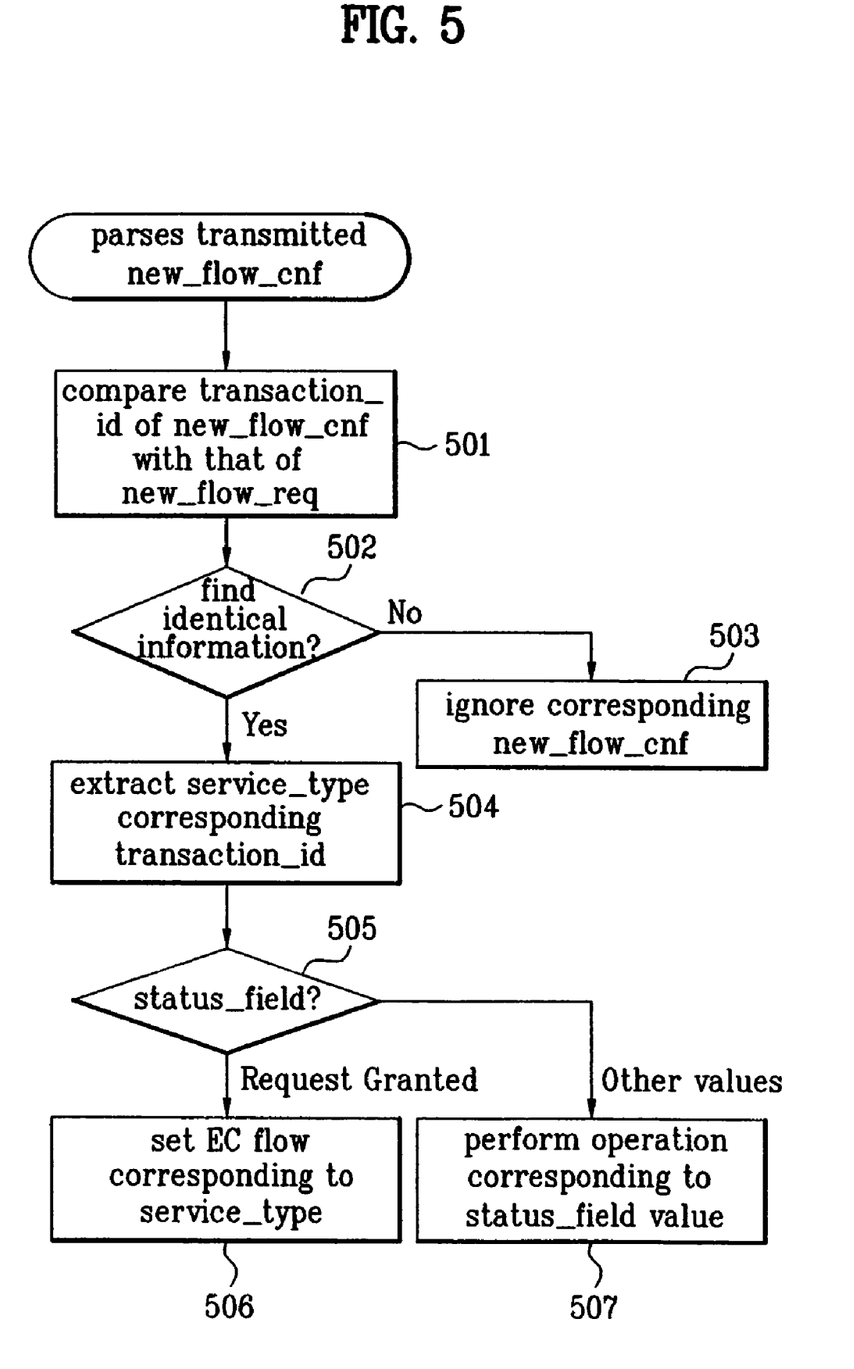
FIG. 5 illustrates an exemplary flow chart for describing operations of an end for receiving the response syntax of FIG. 4B according to one embodiment of the present invention.

FIG. 5 illustrates an exemplary flow chart for describing operations of an end for receiving the response syntax, new_flow_cnf( ) APDU, of FIG. 4B.

At step 501, a transmitted new_flow_cnf( ) APDU is parsed to extract one or more transaction ID field values. Then at step 502, the extracted values are compared with transaction ID field values of the plural new_flow_req( ) APDU to determine whether there are identical values.

If at step 502, a determination is made whether identical transaction ID values exist, and if they exist, a service type corresponding to the transaction ID is extracted in step 504. The service type is extracted in a corresponding new_flow_req( ) APDU. Here, when the status field value in the new_flow_cnf( ) APDU is 0x00, the service type may be extracted from a corresponding new_flow_cnf( ) APDU.

Then, at step 505, a check is performed as to whether a status field value in the new_flow_cnf( ) APDU is 0x00. If the status field value is 0x00, or when connection setting is allowed, an extended channel flow corresponding to the extracted service type is set in step 506. For example, when the service type is an MPEG section, an MPEG section extended channel flow is set, and when the service type is an IP_U, an IP_U extended channel flow is set. Also, if the service type is an IP_M, an IP_M extended channel flow is set.

On the other hand, if at step 505, the status field value is not 0x00, or when connection setting is denied, operations corresponding to the status field values are performed in step 507. Also, at step 502, if identical transaction IDs do not exist, corresponding new_flow_cnf( ) APDU is ignored in step 503.

Figure 6:
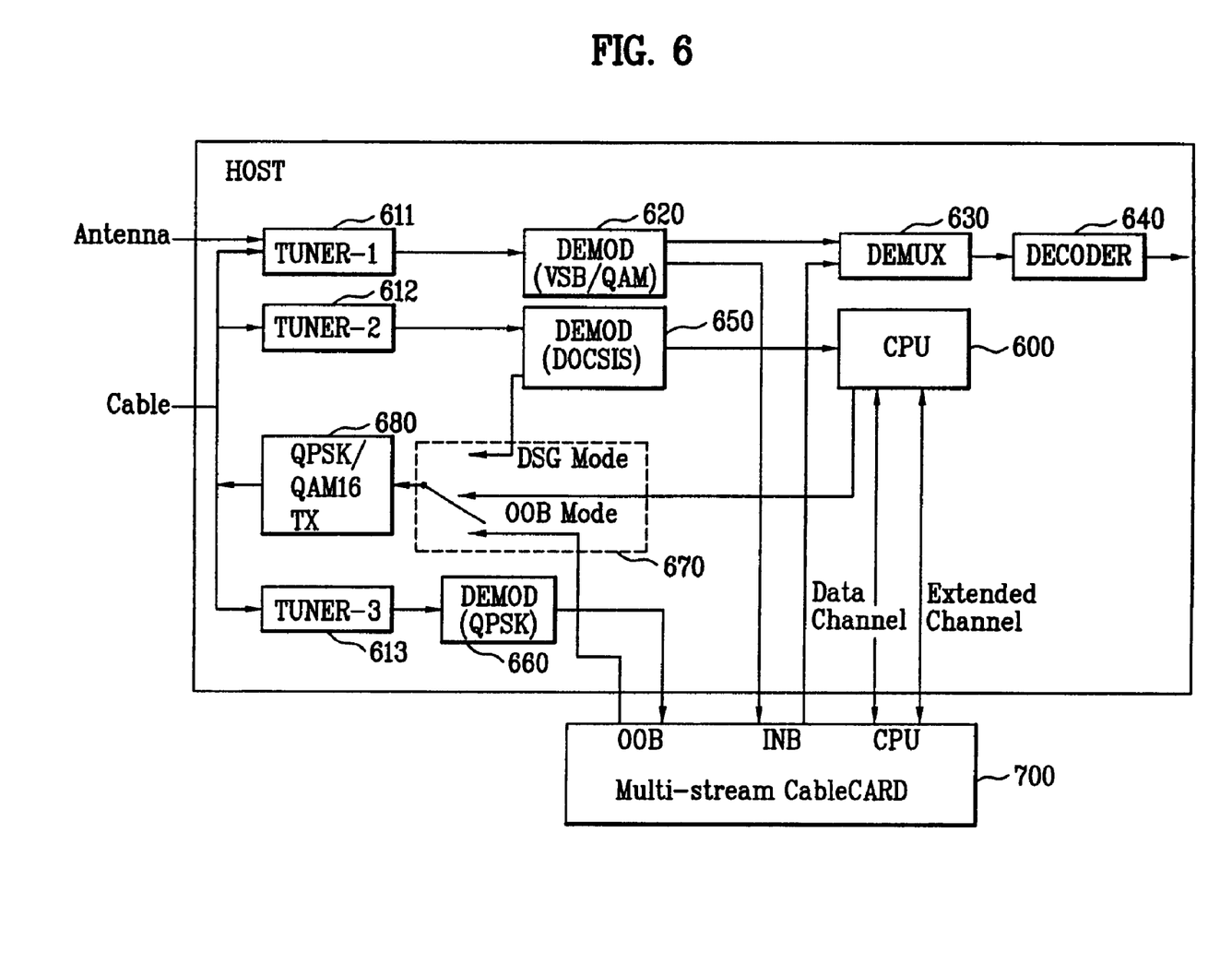
FIG. 6 illustrates a schematic block diagram of an exemplary broadcast receiver according to one embodiment of the present invention.

FIG. 6 illustrates a schematic block diagram of an exemplary broadcast receiver according to one embodiment of the present invention, in which the broadcast receiver includes a cable card. In another embodiment, the broadcast receiver may include a built-in module that may perform an functional equivalent of the cable card. Thus, the description below may be applicable to those broadcast receivers that may or may not use a cable card.

As shown in FIG. 6, the host includes a controller (CPU) 600, first to third tuners 611~613, first to third demodulators 620, 650, and 660, a de-multiplexer 630, a decoder 640, a switching unit 670 and a modulator 680.

A cable card 700 may be a signal stream card to process only a single stream, or a multi-stream card to process a plurality of streams.

The first tuner 611 may tune only a particular channel of a terrestrial A/V broadcast, which is transmitted to an antenna, or a cable A/V broadcast, which may be transmitted through in-band via a cable, and then may output it to the first demodulator 620.

Since transmissions between the terrestrial broadcast and the cable broadcast may be different from each other, demodulations thereof may be different from each other in the first demodulator 620. Namely, the terrestrial A/V broadcast may be modulated by Vestigial Sideband Modulation (VSB) and then transmitted. The cable A/V broadcast may be modulated by Quadrature Amplitude Modulation (QAM) and then transmitted thereto. Therefore, when a channel frequency tuned in the first tuner 611 is terrestrial broadcast, it may be demodulated in VSB in the first demodulator 620. On the other hand, when a channel frequency tuned in the first tuner 611 is cable broadcast, it may be demodulated in QAM.

Also, when signals demodulated in the first demodulator 620 are terrestrial broadcast signals, the demodulated signals are outputted to the demultiplexer 630. On the other hand, signals demodulated in the first demodulator 620 may be cable broadcast signals, and the demodulated signals may be output to the cable card 700 inserted to a slot. The cable card 700 may include a Conditional Access (CA) system to prevent high value added broadcast contents from being copied and to limit access to the contents.

Namely, the cable card 700 may descramble cable Audio/Video (A/V) broadcast, if it is scrambled, and then may output it to the demultiplexer 630. If the cable card 700 is not installed to the receiver, the cable A/V broadcast demodulated in the first demodulator 620 may be directly output to the demultiplexer 630. In this case, since scrambled cable A/V broadcast cannot be descrambled, users may not normally watch and listen to the cable broadcast assuming that the receiver does not include a DCAS.

The de-multiplexer 630 may divide multiplexed video and audio signals into video and audio signals to output them to the decoder 640. The decoder 640 restores A/V signals, which may be compressed through the respective video and audio decoding algorithms, and then may output the restored signals thereto.

On the other hand, the second tuner 612 may tune a particular channel frequency of data broadcast, which may be transmitted through a cable in a DSG method, and then may output it to the second demodulator 650. The second demodulator 650 may demodulate the data broadcast transmitted in a DSG method and then may output the demodulation result to the controller 600.

Also, the third tuner 613 may tune to a particular channel frequency of data broadcast, which may be transmitted through a cable in an OOB method, and then may output it to the third demodulator 660. The third demodulator 660 may demodulate the data broadcast transmitted in an OOB method, based on QPSK, and then may output it to the cable card 700. Namely, since the OOB may use a QPSK transmission method, the receiving side may perform demodulation in a QPSK method.

Also, when bi-directional communication is performed between a cable broadcasting station and a cable broadcast receiver, information may be transmitted from a cable broadcast receiver to a cable broadcasting station by OOB or DSG methods, in which the information includes pay program application, status information of a receiver, user's input, etc. To transmit information, a switching unit 670 may be included. Switching control of the switching unit 670 may be performed by the controller 600.

Namely, when the receiver is in an OOB mode, user status information and receiver status information may be output to the modulator 680 through the cablecard 700 and a switching unit 670. Afterwards, the information may be modulated by a QPSK method in the modulator 680 and then may be transmitted to a cable broadcasting station through a cable connection. On the other hand, when the receiver is in a DSG mode, user status information and receiver status information may be output to the modulator 680 through the controller 600 and a switching unit 670. Afterwards, the information may be modulated by a 16-QAM method in the modulator and then may be transmitted to the cable broadcasting station through a cable connection.

On the other hand, in order to transmit data through an extended channel between the cable broadcast receiver and the cable card, a transmission connection, or a flow, corresponding to a service type (or data type) should be firstly set, in which the service type (or data type) may be defined between the cable card and the cable broadcast receiver.

Here, a controller of an end, which may be the cable card or the cable broadcast receiver, which performs connection setting for the extended channel flow, may include a service type to be connected and information related to the service type in the new_flow_req( ) APDU, as shown in FIG. 1A or FIG. 4A, and then may transmit it thereto. A controller of an other end, which may be the cable card or the cable broadcast receiver, receiving the new_flow_req( ) APDU may determine whether a corresponding flow connection setting can be performed, and may include the determination result in the new_flow_cnf( ) APDU, as shown in FIG. 1B or FIG. 4B, and transmit it to the controller of the corresponding end.

As described above, the cable broadcast receiver, data structures, and methods may provide identification information and sequence information regardless of status field values, such that, when an end transmitting a new_flow_req( ) APDU receives a new_flow_cnf( ) APDU from the opposite end, the end maps the presently received new_flow_cnf( ) APDU to its previously transmitted new_flow_req( ) APDU to analyze the contents thereof.

Also, when an end transmits plural new_flow_req( ) APDU including identical service types thereto and receives plural new_flow_cnf( ) APDU in response to the transmission, the end can correctly map the presently received plural new_flow_cnf( ) APDU to the previously transmitted plural new_flow_req( ) APDU to identify the sequence of the plural new_flow_cnf( ) APDU. Such procedures may increase communication efficiency such that protocol may be easily extended.

As described above, the cable broadcast receivers, data structures, and methods may support IPv6 as well as IPv4 as the length of IP address in the new_flow_cnf ( ) is set to at least 64 bits.

As described above, the broadcast receivers, data structures, and methods may provide a relatively high communication throughput at an extended channel communication between a cable broadcast receiver and a cable card; a protocol structure may be robust; and a protocol may be extendible if the protocol is extended in the future. Also, the described cable broadcast receivers, data structures, and methods have advantages in that they may be compatible IPv6.

The present disclosure may have been described using broadcast receivers in which the broadcast receivers may have terrestrial analog/digital channels, and cable analog/digital channels. With modifications known to those skilled in the art, the present disclosure can be implemented in any terrestrial wired (e.g., telephone) and wireless (e.g., cellular) networks and satellite networks.

It will be appreciated that, in various of the above-disclosed and other features and functions, or alternatives thereof, they may be implemented on a programmed microprocessor, a microcontroller, an integrated circuit element such as ASIC, PLD, PLA, FPGA, or PAL, or the like, a hardwired electronic or logic circuit, or a programmable logic device.

It will be appreciated that the described flow processes, data structures, protocols, or tables can be implemented as a self-consistent sequence of computerized steps that lead to a desired result. These steps can be defined by and/or in one or more computer instructions stored in a computer-readable medium, or can be encompassed using a signal, or provided as software instructions to a processing device. These steps can be performed by a processor executing the instructions that define the steps. Further, the flow process can be performed by a processor executing one or more appropriate programs, by special purpose hardware designed to perform the method, or any combination of such hardware, firmware and software elements.

It will be appreciated that various of the above-disclosed and other features and functions, or alternatives thereof, may be desirably combined into many other different devices or applications. Also, various presently unforeseen or unanticipated alternatives, modifications, variations or improvements therein may be subsequently made by those skilled in the art, and are also intended to be encompassed by the following claims.

What is claimed is:

1. A method for a digital broadcast receiver to process a request and response communication, the method comprising:

sending to a cable card a new flow request APDU (Application Protocol Data Unit) comprising a service type field defining a type of requested service and a data of the requested service, wherein the data of the requested service is a PID (Packet IDentifier) when the service type field is a first value indicating an MPEG (Moving Picture Experts Group) service type is requested, wherein the data of the requested service is a Media Access Control (MAC) address when the service type field is a second value indicating an Internet Protocol (IP) Unicast service type is requested, and wherein the data of the requested service is a Multicast Group ID when the service type field is a third value indicating an IP Multicast service type is requested, the new flow request APDU includes at least one requested service type;

receiving from the cable card a new flow request confirmation APDU that is comprised of the service type field defined in the new flow request APDU and multiple conditional loops for corresponding to the multiple types of requested services that can be indicated in the service type field and a status field located in a position other than within the multiple conditional loops, wherein the status field is a first status field value when the new flow request APDU is granted and a second status field value when the new flow request APDU is denied, and executing the conditional loop that corresponds to the requested service indicated by the service type field when the status field is a first status field value.

2. The method of claim 1, wherein the position is a header of the new flow request confirmation APDU.

3. The method of claim 1, wherein the new flow request confirmation APDU further includes a first loop corresponding to the MPEG service type, a second loop corresponding to the IP unicast service type and a third loop corresponding to the IP multicast service type.

4. The method of claim 3, wherein the second loop further includes an IP address and flow type.

5. The method of claim 4, wherein the IP address comprises at least 64 bits.

6. The method of claim 1, the status field includes both a first information identifying whether the requested service is granted or denied and a second information indicating reasons that the requested service is denied.

7. The method of claim 6, the reasons correspond to at least one of a first reason that number of flows is exceeded, a second reason that the service type field is unavailable, a third reason that a network is unavailable, a fourth reason that a network is busy and a fifth reason that the MAC address is unacceptable.

8. A digital broadcast receiver including a host and a cable card, the receiver comprising:
    a host configured to transmit to a cable card a new flow request APDU (Application Protocol Data Unit) comprising a service type field defining a type of requested service and a data of the requested service, transmit a PID (Packet IDentifier) as the data of the requested service with the new flow request APDU when the service type field is a first value indicating an MPEG (Moving Picture Experts Group) service type is requested, transmit a Media Access Control (MAC) address as the data of the requested service with the new flow request APDU when the service type field is a second value indicating an Internet Protocol Unicast service type is requested, and transmit a Multicast group ID as the data of the requested service with the new flow request when the service type field is a third value indicating an IP Multicast service type is requested, wherein the new flow request APDU includes at least one requested service type; and
    wherein the host is further configured to receive from the cable card a new flow request confirmation APDU that is comprised of the service type field defined in the new flow request APDU and multiple conditional loops for corresponding to the multiple types of requested services that can be indicated in the service type field and a status field located in a position other than within the multiple conditional loops, wherein the status field is a first status field value when the new flow request APDU is granted and a second status field value when the new flow request APDU is denied, and execute the conditional loop that corresponds to the requested service indicated by the service type field when the status field is a first status field value.

9. The digital broadcast receiver of claim 8, wherein the execution of the conditional loop when the status field is a first status field value comprises allocating a PID having a value identical to the PID included with the new flow request APDU when the service type field is a first value indicating an MPEG (Moving Picture Experts Group) service type is requested, allocating a MAC address identical to the Media Access Control (MAC) address included with the new flow request APDU when the service type field is a second value indicating an Internet Protocol Unicast service type is requested, and allocating a Multicast Group ID having a value identical to the Multicast Group ID included with the new flow request when the service type field is a third value indicating an IP Multicast service type is requested.

10. A method to process digital broadcast data in a digital broadcast receiver, the method comprising:
    receiving a broadcast signal in a tuner;
    demodulating the broadcast signal from the tuner in a demodulator;
    demultiplexing the broadcast signal from the demodulator in a demultiplexer;
    decoding the demultiplexed signal from the demultiplexer in a decoder;
    transmitting to a cable card a new flow request APDU (Application Protocol Data Unit) comprising a service type field defining a type of requested service and a data of the requested service, wherein the data of the requested service is a PID (Packet IDentifier) when the service type field is a first value indicating an MPEG (Moving Picture Experts Group) service type is requested, wherein the data of the requested service is a Media Access Control (MAC) address when the service type field is a second value indicating an Internet Protocol (IP) Unicast service type is requested, and wherein the data of the requested service is a Multicast Group ID when the service type field is a third value indicating an IP Multicast service type is requested, the new flow request APDU includes at least one requested service type;
    receiving from the cable card a new flow request confirmation APDU that is comprised of the service type field defined in the new flow request APDU and multiple conditional loops for corresponding to the multiple types of requested services that can be indicated in the service type field and a status field located in a position other than within the multiple conditional loops, wherein the status field is a first status field value when the new flow request APDU is granted and a second status field value when the new flow request APDU is denied, and
    executing the conditional loop that corresponds to the requested service indicated by the service type field when the status field is a first status field value.

11. A digital broadcast receiver for processing digital broadcast data, comprising:
    a tuner for tuning a broadcast signal;
    a demodulator for demodulating the received broadcast signal from the tuner;
    a demultiplexer for demultiplexing the received broadcast signal from the demodulator;
    a decoder for decoding the received broadcast signal from the demultiplexer;
    a controller for transmitting to a cable card a new flow request APDU (Application Protocol Data Unit) comprising a service type field defining a type of requested service and a data of the requested service, transmit a PID (Packet IDentifier) as the data of the requested service with the new flow request APDU when the service type field is a first value indicating an MPEG (Moving Picture Experts Group) service type is requested, transmit a Media Access Control (MAC) address as the data of the requested service with the new flow request APDU when the service type field is a second value indicating an Internet Protocol Unicast service type is requested, and transmit a Multicast group ID as the data of the requested service with the new flow request when the service type field is a third value indicating an IP Multicast service type is requested, wherein the new flow request APDU includes at least one requested service type; and the controller further receives from the cable card a new flow request confirmation APDU that is comprised of the service type field defined in the new flow request APDU and multiple conditional loops for corresponding to the multiple types of requested services that can be indicated in the service type field and a status field located in a position other than within the multiple conditional loops, wherein the status field is a first status field value when the new flow request APDU is granted and a second status field value when the new flow request APDU is denied, and execute the conditional loop that corresponds to the requested service indicated by the service type field when the status field is a first status field value.

12. The method of claim 10, wherein executing the conditional loop when the status field is a first status field value comprises allocating a PID having a value identical to the PID included with the new flow request APDU when the service type field is a first value indicating an MPEG (Moving Picture Experts Group) service type is requested, allocating a MAC address identical to the Media Access Control (MAC) address included with the new flow request APDU when the service type field is a second value indicating an Internet Protocol Unicast service type is requested, and allocating a Multicast Group ID having a value identical to the Multicast Group ID included with the new flow request when the service type field is a third value indicating an IP Multicast service type is requested.

13. The digital broadcast receiver of claim 11, wherein the execution of the conditional loop when the status field is a first status field value comprises allocating a PID having a value identical to the PID included with the new flow request APDU when the service type field is a first value indicating an MPEG (Moving Picture Experts Group) service type is requested, allocating a MAC address identical to the Media Access Control (MAC) address included with the new flow request APDU when the service type field is a second value indicating an Internet Protocol Unicast service type is requested, and allocating a Multicast Group ID having a value identical to the Multicast Group ID included with the new flow request when the service type field is a third value indicating an IP Multicast service type is requested.

* * * * *